United States Patent [19]

Nishii

[11] Patent Number: 5,065,580
[45] Date of Patent: Nov. 19, 1991

[54] TANDEM MASTER CYLINDER WITH LIMITED-MOTION BOOSTER PISTON AT PEDAL-REMOTE END OF MASTER CYLINDER AND WITH BOOSTER FLUID CUT VALVE

[75] Inventor: Michiharu Nishii, Toyota, Japan

[73] Assignee: Aisin Seiki Kabushiki Kaisha, Aichi, Japan

[21] Appl. No.: 496,697

[22] Filed: Mar. 21, 1990

[30] Foreign Application Priority Data

Mar. 31, 1989 [JP] Japan .................... 1-083743

[51] Int. Cl.$^5$ .............................. B60T 13/12
[52] U.S. Cl. ............................ 60/547.1; 60/562
[58] Field of Search ................... 60/547.1, 562

[56] References Cited

U.S. PATENT DOCUMENTS

| | | | |
|---|---|---|---|
| 3,827,242 | 8/1974 | Belart | 60/552 |
| 4,876,853 | 10/1989 | Shirai et al. | 60/547.1 |
| 4,891,945 | 1/1990 | Becker | 60/547.1 |
| 4,940,290 | 7/1990 | Nishii et al. | 60/547.1 X |

FOREIGN PATENT DOCUMENTS

59-209948 11/1984 Japan .
59-227552 12/1984 Japan .
62-155167 7/1987 Japan .

Primary Examiner—Edward K. Look
Assistant Examiner—George Kapsalas
Attorney, Agent, or Firm—Burns, Doane, Swecker & Mathis

[57] ABSTRACT

A hydraulic braking system includes a piston disposed at a wall end of the bore of a master cylinder so as to move a normally open valve mechanism of the master cylinder toward a closed position by applying an output pressure from a boost device or dynamic hydraulic generator. Due to applying the output pressure of the boost device or the dynamic hydraulic pressure generator to the piston, the initial stroke of the brake pedal is reduced by decreasing the idle stroke of the master cylinder and the braking pressure is ensured from the master cylinder when the output pressure of the boost device or the dynamic hydraulic pressure generator is not applied.

7 Claims, 1 Drawing Sheet

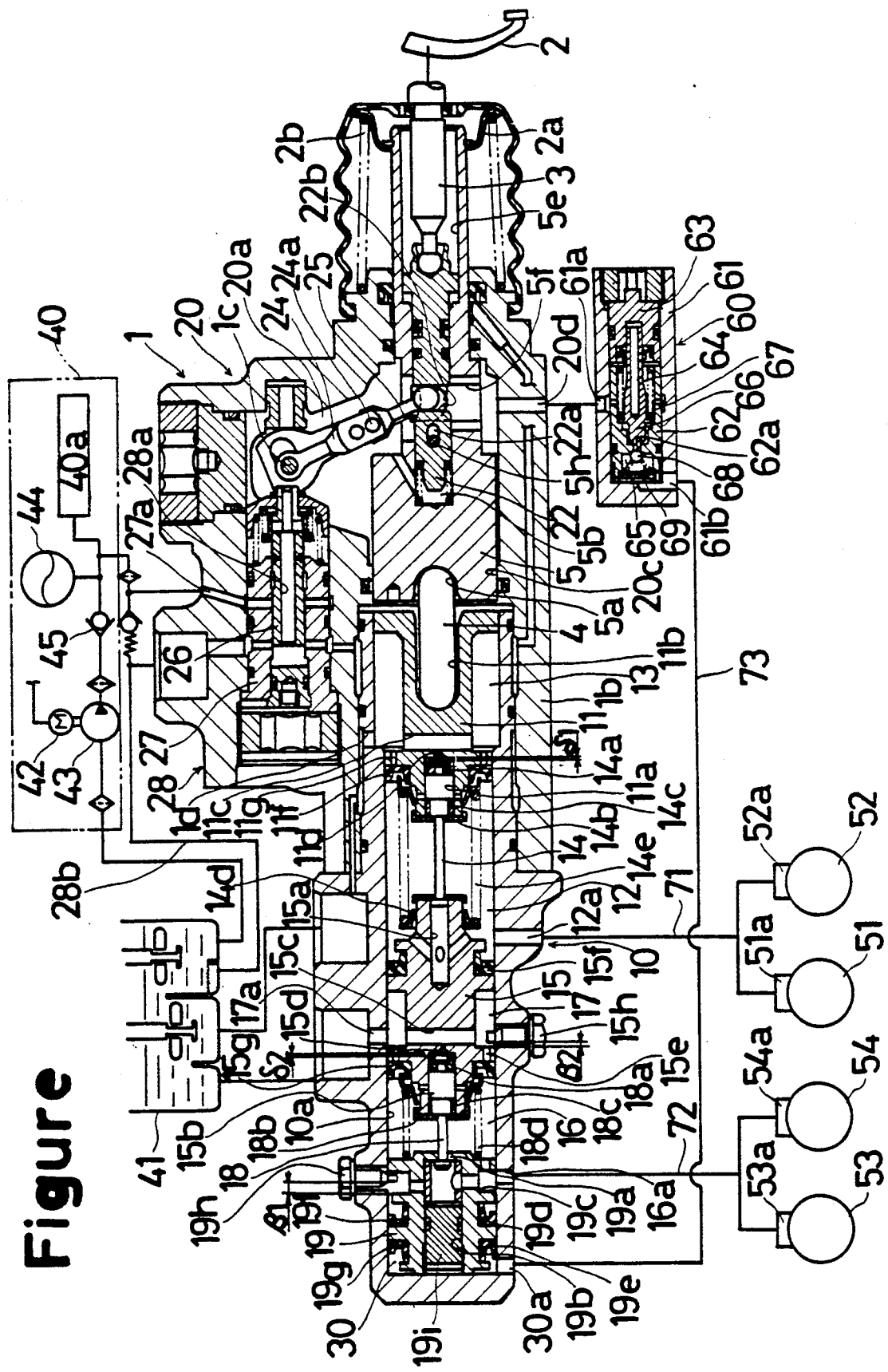
Figure

TANDEM MASTER CYLINDER WITH LIMITED-MOTION BOOSTER PISTON AT PEDAL-REMOTE END OF MASTER CYLINDER AND WITH BOOSTER FLUID CUT VALVE

BACKGROUND OF THE INVENTION

1. Field of the Invention

The present invention relates to a braking system for use in an automotive vehicle and particularly to a hydraulic braking system comprising a master cylinder and a boost means or dynamic hydraulic braking pressure generator which outputs hydraulic power pressure supplied from a power source in response to the depression or actuation of a brake pedal.

2. Description of the Related Art

In a conventional service braking system for an automotive vehicle, there is provided a plurality of hydraulic circuits connecting wheel brake cylinders, associated with the vehicle wheels, with a hydraulic braking pressure generator such as a master cylinder so that when one of the hydraulic circuits fails braking operation is achieved by the remaining hydraulic circuits. In general, a tandem master cylinder is used in conventional dual circuit systems.

In order to reduce the force required to operate the brake pedal in the braking operation, the hydraulic braking system is provided with a servo unit which is referred as a servo or a booster and which utilizes compressed air, intake manifold vacuum (for a vacuum booster), or hydraulic pressure (for a hydraulic booster) as a power source. The hydraulic booster is a booster which actuates a hydraulic braking pressure generator, such as the master cylinder, by the hydraulic power pressure supplied from the power source in response to depression of the brake pedal. For example, Japanese Patent Laid-Open Publication No. 59—209948 discloses a system providing hydraulic boost to a tandem master cylinder which will operate as the ordinary tandem master cylinder when the hydraulic booster is not operated.

With employment of such a hydraulic booster, it has been proposed to employ the hydraulic booster as a dynamic hydraulic pressure generator in addition to the master cylinder. In other words, a hydraulic pressure boosted by the booster (hereinafter referred to as boost pressure) in response to the depression of the brake pedal is applied directly to a hydraulic braking circuit. For example, as shown in Japanese Patent Laid-Open Publication No. 59—227552, boost pressure of the hydraulic booster is applied to rear wheel brake cylinders in a front-rear dual circuit braking system in order to reduce the stroke of the brake pedal.

Further, regarding the hydraulic braking pressure generator provided with the tandem master cylinder and the hydraulic booster, it has been proposed to connect one of the pressure chambers of the tandem master cylinder with the wheel cylinders of one of the hydraulic circuits and to output the boost pressure of the hydraulic booster to the wheel cylinders of the other hydraulic circuits via the remaining pressure chamber of the tandem master cylinder. Such a hydraulic braking system is disclosed in Japanese Patent Laid-Open Publication No. 62—155167. According to this system, various effects such as the shortening of the stroke of the brake pedal and so on are obtained.

In the above described Japanese Patent Laid-Open Publication No. 59—227552 since the boost pressure of the hydraulic booster, the dynamic hydraulic pressure, is directly supplied to the rear wheel cylinders, if the failure or loss of the hydraulic pressure occurs at the rear wheel cylinders or the hydraulic conduit connecting with the rear wheel cylinders, there is a danger of the brake fluid filling up the power pressure circuit, including the hydraulic booster. Since the hydraulic pressure of the front wheel cylinders is not generated until a piston moves a predetermined distance so as to interrupt the fluid communication between a fluid chamber and a pressure chamber, an initial idle stroke exists in the brake pedal operation so as to prevent reduction of the stroke of the brake pedal. In Japanese Patent Laid-Open Publication No. 62—155167, the boost pressure, i.e., the dynamic hydraulic pressure is directly supplied to the wheel cylinders of the other hydraulic circuits via a second fluid chamber and a second pressure chamber except for abnormal operating conditions. Accordingly, the flow of the brake fluid is assured by the communication between the wheel cylinders and the dynamic hydraulic braking pressure generator when either of the wheel cylinder of the dynamic hydraulic braking pressure generator fails. Further, a first pressure chamber is in communication with a reservoir via a compensating port until a first piston moves a predetermined distance so as to close the fluid communication between the reservoir and the first pressure chamber by a cup seal provided on the piston.

SUMMARY OF THE INVENTION

It is therefore, an object of the present invention to reduce the stroke of the brake pedal by decreasing the idle stroke of the master cylinder.

It is another object of the present invention to reduce the stroke of the brake pedal by decreasing the idle stroke of the master cylinder by use of the output pressure of the dynamic hydraulic braking pressure generator without directly applying the output pressure of the dynamic hydraulic braking pressure to the wheel cylinders.

It is a further object of the present invention to reduce the stroke of the brake pedal by decreasing the idle stroke of the master cylinder by use of the output pressure of the dynamic hydraulic braking pressure generator and to ensure the normal operation of the dynamic hydraulic braking pressure generator when fluid loss occurs in the wheel cylinder side of the circuits.

In order to achieve these objects, there is provided an improved hydraulic braking system which includes a master cylinder having a bore with an opening and a closed wall at opposite ends thereof. A piston is slidably positioned in the bore and operatively connected to a brake pedal. At least one fluid chamber and at least one pressure chamber are defined in the bore by the piston. A normally open valve is provided in the piston and is operable to close a fluid passage formed in the piston and providing communication between the fluid chamber and the pressure chamber when the piston is moved in response to depression of the brake pedal. A boost means is provided for actuating the master cylinder in response to depression of the brake pedal. A plurality of wheel cylinders, for braking respective road wheels, is divided into a first group of wheel brake cylinders connected with one of the hydraulic circuits and a second group of wheel brake cylinders connected with another of the hydraulic circuits. The pressure chamber communicates with at least one of the hydraulic circuits, and a piston is disposed at the closed wall portion and moves the normally open valve toward its closed position by applying an output pressure of the boost means.

Further, in order to achieve these objects, there is provided an improved hydraulic braking system which includes a master cylinder having a bore with an opening and a closed wall at opposite ends thereof and at least one piston slidably positioned in the bore and operatively connected to a brake pedal. At least one fluid chamber and at least one pressure chamber are defined in the bore by the piston. A normally open valve is connected in the piston so as to close a passage formed in the piston and provide communication between the fluid chamber and the pressure chamber when the piston is moved in response to depression of the brake pedal. A power source generates a hydraulic power pressure. A dynamic hydraulic braking pressure generator introduces the hydraulic power pressure supplied from the power source and outputs the output pressure regulated in response to depression of the brake pedal. A plurality of wheel cylinders, for braking respective road wheels, is divided into a first group of wheel brake cylinders connected with one of the hydraulic circuits and a second group of wheel brake cylinders connected with another of the hydraulic circuits. The pressure chamber communicates with either hydraulic circuit. A piston is slidably disposed between the piston and the closed wall and forms an operational chamber which is fluid-tightly separated from the pressure chamber and in fluid communication with the dynamic hydraulic braking pressure generator.

BRIEF DESCRIPTION OF THE DRAWING

Additional objects and advantages of the present invention will become more apparent from the following detailed description of preferred embodiments thereof when considered with reference to the attached drawing, in which:

The FIGURE is a schematic illustration of a hydraulic braking system of an embodiment of the present invention.

DETAILED DESCRIPTION OF THE PREFERRED EMBODIMENTS

A hydraulic braking system constructed in accordance with one of the embodiments of the present invention will be described with reference to the drawing.

Referring to the FIGURE, there is schematically illustrated a hydraulic braking pressure generator 1 which includes a tandem master cylinder 10 and a hydraulic booster 20. The hydraulic booster 20 is utilized as a boost means and a dynamic hydraulic braking pressure generator. As a result, a depression force applied on a brake pedal 2 is transmitted as a brake operating force to an input rod 3, and in response to this brake operating force, hydraulic pressure introduced from a power source 40 or a reservoir 41 is appropriately regulated and applied to wheel cylinders 51a and 52a (53a and 54a) of front wheels 51 and 52 (rear wheels 53 and 54) through a first hydraulic passage 71 (a second hydraulic passage 72).

The tandem master cylinder 10 includes a housing 1a with a bore 10a. In the bore 10a, a first piston 11 and a second piston 15 are slidably and fluid-tightly positioned. A third piston 19 is slidably and fluid-tightly positioned between the second piston 15 and a bottom portion or end wall of the bore 10a. At opposite ends of the first piston 11, a large-diameter land and a small-diameter land are formed. The right side of the bore 10a is formed into a stepped configuration so as to receive the first piston 11. A cup seal 11f is fitted on the small-diameter land of the first piston 11 and the small-diameter land of the first piston 11 is slidably and fluid-tightly received in a small-diameter bore portion of the bore 10. Thereby, a first fluid chamber 13 is defined between both lands in the bore 10a. A large-diameter bore portion of the bore 10a is in fluid communication with the reservoir 41 via a port 11d.

The first piston 11 has holes or openings 11a and 11b extending axially from its opposite ends towards its center, respectively, and a hole or opening 11c extends radially through the piston and communicates with the hole 11a through a small port 11d. A valve member 14a, formed at one end portion of a valve rod 14, is movably received in the hole 11a, opposite the hole or port 11d, and is restricted from moving towards the second piston 15 by a retainer 14b mounted on the first piston 11. Axial holes or openings 11g are formed in the small-diameter land of the first piston 11 and a cup seal 11f covers the holes 11g. As a result, a check valve is provided by holes 11g and the cup seal 11f. A spring 14c is interposed between the retainer 14b and the valve member 14a so as to continually urge the valve member 14a toward the hole 11d. An output rod 4 is positioned in the hole 11b.

At opposite ends of the second piston 15, respective lands are formed thereon and cup seals 15f and 15g are fitted on the lands. Thereby, a second fluid chamber 17 is defined between both lands of the second piston 15 in the bore 10a and a first pressure chamber 12 is defined between the cup seal 15f and the cup seal 11f of the first piston 11 in the bore 10a. This first pressure chamber 12 is communicated with the wheel cylinders 51a and 52a of the front wheels via a port 12a and the first hydraulic passage 71, and the second fluid chamber 17 is communicated with the reservoir 41 via a port 17a.

The second piston 15 has a hole or opening 15a formed axially in the piston 15 and opening into the first pressure chamber 12. A port 15c is formed radially in the piston and is in communication with the second fluid chamber 17. A large diameter end portion of the valve rod 14 is slidably received in the hole 15a and is restricted from moving towards the first piston 11 by a retainer 14d mounted on the second piston 16.

A return spring 14e is interposed between the retainer 14d and the retainer 14b so as to continually urge the first piston 11 and the second piston 15 away from each other. Thus, opposite end portions of the valve rod 14 are normally in engagement with the respective retainer 14d and the retainer 14b. This arrangement separates the valve member 14a from the hole 11d by a predetermined distance $\delta_1$ and brake fluid, supplied from the reservoir 41 to the first fluid chamber 13 through the port 1d, fills the first pressure chamber 12 through the hole 11g or the holes 11c, 11d and 11a. Thus, when the first piston 11 is moved towards the second piston 15 against the urging force of the return spring 14e, the cup seal 11f and the valve member 14a close the openings 11g and 11d, respectively, so that the first pressure chamber 12 is only in communication with the port 12a. Accordingly, the pressure of the brake fluid is raised in response to movement of the first piston 11.

The second piston 15 has a hole or opening 15b extending axially thereof and communicating with port 15c through a small port 15d. A valve member 18a formed on one end portion of a valve rod 18 is movably received in the hole 15b opposite to the port 15d and is restricted from moving towards the third piston 19 by a retainer 18b mounted on the second piston 15. Axially extending ports 15e are formed in the land of the second piston 15 and a cup seal 15g covers the ports 15e. As a result, a check valve is provided by ports 15e and the cup seal 15g. A spring 18c is interposed between the retainer 18b and the valve member 18a so as to continually urge the valve member 18a toward the port 15d. A stop bolt 15h is threaded radially into the housing 1a so that a head portion projects into the second fluid chamber 17. Thereby, the second piston 15 is restricted from moving towards the first piston 11 due to contact between the land of the second piston 15 provided with the port 15e, a the head portion of the stop bolt 15h.

The third piston 19 is fluid-tightly and slidably received between the second piston 15 and the wall portion of the bore 10a. The third piston 19 has an axial hole 19b which has an inner flange portion 19a and circular grooves 19c, 19d and 19e. A large diameter end portion of the valve rod 18 is slidably received in the hole 19b and is restricted from moving towards the second piston 15 by the inner flange portion 19a of the third piston 19. A plug 19i is fluid-tightly secured into the hole 19b at the wall portion side of the bore 10a. Cup seals 19f, 19g are fitted in the respective circular grooves 19d, 19e. Thereby, a second pressure chamber 16 is defined between the cup seal 19f of the third piston 19 and the cup seal 15g of the second piston 15 and a third pressure chamber 30 is defined between the cup seal 19g of the third piston 19 and the wall portion of the bore 10a. The second pressure chamber 16 is in communication with the wheel cylinders 53a and 54a of the rear wheels via a port 16a and the second hydraulic passage 72. The third pressure chamber 30 is utilized as an operational chamber. A stop bolt 19h is threaded radially into the housing 1a so that a head portion projects into the circular groove 19c of the third piston 19. Thereby, the third piston 19 is restricted from moving towards the second piston 15 due to contact between the side surface of the circular groove 19c and the head portion of the stop bolt 19h. The stop bolt 19h is utilized as a restricting means.

A return spring 18d is interposed between the retainer 18b and the third piston 19 so as to continually urge the second piston 15 and the third piston 19 away from each other. Thus, opposite end portions of the valve rod 18 are normally in engagement with the retainer 18b and the inner flange portion 19a, respectively. Accordingly, the valve member 18a is separated from the port 15d by a predetermined distance $\delta_2$ and brake fluid is supplied from the reservoir 41 to the second fluid chamber 17 through the port 17a and is transmitted to the second pressure chamber 16 through the port 15e or the openings 15c, 15d and 15b. Thus, when either the second piston 15 and the third piston 19 are moved so as to approach each other against the urging force of the return spring 18d, the cup seal 15g and the valve member 18a close the port 15e and opening 15d, respectively, so that the second pressure chamber 16 is held in a closed state except for its connection with port 16a. Accordingly, pressure of the brake fluid is increased in response to movement of either the second piston 15 or the third piston 19.

The third piston 19 is held in a position in which the end surface of the third pressure chamber 30 is in contact with the surface of the wall portion of the bore 10a by the return spring 18d when the braking system is not operated, as shown in the Figure. Thereby, the head portion of the stop bolt 15h and the side surface of the third pressure chamber 30, in the circular groove 19c, are spaced from each other by a predetermined distance $\beta_1$ when the braking system is not operational. Further, the first piston 11 and the second piston 15 are held in the position shown in the FIGURE when the braking system is not operational. The valve member 14a and the hole or opening 11d are spaced from each other by a predetermined distance $\delta_1$ and the valve member 18a and the hole or opening 15d are spaced from each other by a predetermined distance $\delta_2$. Further, the head portion of the stop bolt 15h and the land of the second pressure chamber 16, at the side of the second piston 15, are spaced from each other by a predetermined distance $\beta_2$. In this embodiment, $\beta_1$ is predetermined to be greater than the sum of $\delta_1$ and $\delta_2$, and $\beta_2$ is predetermined to be greater than $\delta_1$.

The third pressure chamber 30 is in communication with a port 20d of the hydraulic booster 20, discussed below, through a port 30a and a third hydraulic passage 73. When the hydraulic power pressure is not supplied from the hydraulic booster 20 to the third pressure chamber 30, an end surface of the third pressure chamber 30 is in contact with the surface of the wall portion of the bore 10a as shown in the FIGURE, or the head portion of the stop bolt 19h is in contact with a side surface of the circular groove 19c of the third piston 19 as shown in the FIGURE. In this position, the volume of the third pressure chamber 30 is maintained at a minimum value. When the hydraulic power pressure is supplied from the hydraulic booster 20 to the third pressure chamber 30, the third pressure chamber 30 is expanded and the third piston 19 is moved toward the second piston 15 until the head portion of the stop bolt 19h contacts the side surface of the circular groove 19c which is closest to the chamber 30.

In a housing 1b joined with the housing 1a, a boost chamber 20a of the hydraulic booster 20 is provided, and a power piston 5 is fluid-tightly and slidably disposed in a bore 20c which is substantially coaxial with the cylinder bore 10a. The power piston 5 is provided with a retainer (not shown) at an end extending toward the brake pedal 2, and a spring 2b is mounted between the retainer 2a and the housing 1b so as to normally urge the power piston 5 toward the brake pedal 2. The power piston 5 has a middle portion provided with a shoulder portion which abuts the housing 1b to restrict the power piston 5 from sliding toward the brake pedal 2.

In the power piston 5, a recess 5a is formed at the end facing the first piston 11, and a stepped bore is formed axially in the center of piston 5. The stepped bore comprises a small diameter bore 5b and a large-diameter bore 5e. In the small diameter bore 5b, a reaction piston 22 is slidably received therein, and a space is formed between the bottom surface of the small diameter bore 5b and the head portion of the reaction piston 22 which is in communication with the boost chamber 20a.

An elongated hole 22a is formed in the reaction piston 22 and extends coaxially with the axis of the reaction piston 22. A through-hole 22b extends perpendicularly to the elongated hole 22a. A pin 5h, fixed to the power piston 5, is disposed in the elongated hole 22a, so that the reaction piston 22 is restricted from sliding at least toward the brake pedal 2 with respect to the power piston 5. One end of an input rod 3 is connected to the brake pedal 2, and the other end of the input rod 3 is provided with a spherical head which is inserted in the large diameter bore 5e of the power piston 5 and received in the recess of the reaction piston 22, and which is engaged with a projection formed on the inner surface of the recess. In the power piston 5, a radial through-hole 5f having a diameter larger than through-hole 22b is aligned with the through-hole 22b when the reaction piston 22 is positioned most closely to the brake pedal 2. The output rod 4 is received in the recess 5a of the power piston 5.

A support lever 24 is pivotally connected at one end to the housing 1b by a pin 1c for pivotal movement within the boost chamber 20a, and a spherical head of the support lever 24 is fitted into the through-hole 22b of the reaction piston 22. A control lever 25 is pivotally connected with the support lever 24 by a pin 24a approximately in its center, and one head of the control lever 25 is fitted into a through-hole 5f of the power piston 5. In the other end of the control lever 25, a hole is formed around the pin 1c of the support lever 24. Accordingly, when the reaction piston 22 slides toward the output rod 4 with respect to the power piston 5 which is pressed toward the brake pedal 2, a rotating force is exerted on the support lever 24 so as to pivotally move the support lever 24 clockwise about the pin 1c. At this time, since one head of the control lever 25 is retained in the through-hole 5f of the power piston 5, the other head of the control lever 25 is rotated counterclockwise about the pin 24a and hence, is moved in the sliding direction of the reaction piston 22. As a result, the other head of the control lever 25 is displaced in response to movement of the reaction piston 22 until it comes into contact with the bottom surface of the small diameter hole 5b.

The housing 1b has a spool-valve bore extending substantially in parallel with the power piston 5 and communicating with the boost chamber 20a, and a spool valve 28 which functions as a hydraulic pressure control valve is fitted into the spool valve bore. The spool valve 28 has a spool 26 slidably received in a spool bore formed in a cylinder 27 substantially in parallel with the power piston 5. The spool valve 28 is operated by the control lever 25 and the hydraulic power pressure of the power source 40 supplied to the boost chamber 20a via a port 27a and a power passage 28a is controlled at a prescribed pressure. The boost chamber 20a is communicated with the reservoir 41 when the hydraulic booster 20 is in its initial position, and the boost chamber 20a is also communicated with the reservoir 41 through a drain passage 28b for returning the superfluous brake fluid when the hydraulic pressure of the boost chamber 20a is at the boost pressure. Also, the port 20d which is formed in the housing 1b so as to communicate with the boost chamber 20a is in fluid communication with the third pressure chamber 30 of the tandem master cylinder 10 via the port 20d, the third hydraulic passage 73 and the port 30a.

The power source 40 comprises an accumulator 44 for generating a hydraulic power pressure along with a fluid pump 43 which is connected to the accumulator 44 via a check valve 45 and connected to the reservoir 41 which stores an amount of hydraulic fluid. The power source 40 is constructed so as to supply the power hydraulic pressure via the accumulator 44. The fluid pump 43 is operated by a motor 42 which is actuated by an electric control signal from an electric control device (not shown). Namely, the power hydraulic pressure is maintained at a predetermined value or pressure level by being intermittently controlled by the motor 42, through the electric control device, in response to the electric control signal from a pressure sensor 40a.

In this embodiment, a cut valve 60 is disposed in the third hydraulic passage 73 as a valve means which appropriately controls the communication of the third hydraulic passage 73. The cut valve 60 includes a housing 61 having an inner bore, a case 62 fluid-tightly positioned in the inner bore of the housing 61 and a plug 63 also fluid-tightly positioned in the inner bore of the housing 61. A plunger 66 having one end portion fluid-tightly and slidably guided in the plug 63 is slidably disposed in the case 62. Thereby, a fluid chamber 64 communicates with the port 20d of the hydraulic booster 20 through a port 61a of the housing 61 and through a port in the case 62. A fluid chamber 65 communicates with the port 30a of the housing 1b of the tandem master cylinder 10 through a port 61b defined in the housing 61. A projection portion is formed in the opposite end portion of the plunger 66 and penetrates into an axial hole 62a which is formed in the case 62 and which communicates with both fluid chambers 64 and 65. The plunger 66 is continually urged by a spring 67 which is interposed in the fluid chamber 65 so as to extend the projection portion into the hole 62a. An area of the plunger 66, facing in the direction of the fluid chamber 65, is of a predetermined larger area than an area of the plunger 66 facing in the direction of the fluid chamber 64. A ball valve member 68 is disposed in the fluid chamber 65 and is continually urged by a spring 69 so as to close the hole 62a. The load (spring constant) of the spring 69 is of a predetermined lower value than the load (spring constant) of the spring 67. Accordingly, the ball valve member 68 is moved by the projection portion of the plunger 66 against the spring 69 in normal conditions and the hole 62a is opened. Therefore, during normal operating conditions the third hydraulic passage 73 is in communication with the port 20d. Thus, when the hydraulic pressure supplied into both fluid chambers 64, 65 becomes greater than the predetermined value of the spring 67, the plunger 66 is moved against the spring 67 by the differential of the area subjected to hydraulic pressure, and the ball valve member 68 closes the hole 62a and the third hydraulic passage 73 is interrupted.

The above-described embodiment of the hydraulic braking system 1 operates as follows: The FIGURE shows the system when the brake pedal 2 is not depressed. In this condition, the first fluid chamber 13 is in communication with the reservoir 41 which is in fluid communication with the first pressure chamber 12 so as to provide brake fluid to the wheel cylinders 51a and 52a of the rear wheels 51 and 52. The brake fluid which is filled therein (in one of the hydraulic circuits) is at the same pressure as that of the reservoir 41, i.e., atmospheric pressure. Also, since the brake fluid in the second pressure chamber 16 and the second fluid chamber 17 is in fluid communication with the reservoir 41 via the port 17a is at atmospheric pressure, the brake fluid in the wheel cylinders 53a and 54a, which are in communication with the second pressure chamber 16 via the port 16a and the second hydraulic passage 72, is also at atmospheric pressure. When the power source 40 is operated, the hydraulic power pressure of the power source 40 is supplied to the hole or port 27a. But, in this condition, since the hole or port 27a is closed, the hydraulic booster 20 is not operated.

When the brake pedal 2 is depressed, the reaction piston 22 is moved via the input rod 3. The reaction piston 22 is moved until the reaction piston 22 abuts the power piston 5. The control lever 25 is then rotated counterclockwise about the pin 24a with respect to the support lever 24 so that the head of the control lever 25 contacts and moves the spool 26. Thereby, the hydraulic power pressure from the power source 40 is introduced into the boost chamber 20a to push the power piston 5 so as to apply the boost force to the first piston 11 and the reaction force is transmitted to the brake pedal 2 via the reaction piston 22.

At the same time, the hydraulic power pressure is supplied from the port 20d to the third fluid chamber 30 via the third hydraulic passage 73. Thereby, the third pressure chamber 30 expands to move the third piston 19 toward the second piston 15 through the predetermined distance $\beta_1$ against the force of spring 18c until the head portion of the stop bolt 19h contacts the side surface of the circular groove 19c of the third piston 19 closest to the chamber 30. As a result, engagement between the large diameter end portion of the valve rod 18 and the inner flange portion 19a of the third piston 19 is released and the valve member 18a closes the port 15d. Further, the second piston 15 is moved toward the first piston 11 through the predetermined distance $\beta_2$ until the head portion of the stop bolt 15h contacts the land of the second piston 15. Thus, engagement between the large diameter end portion of the valve rod 14 and the retainer 14d is released and the valve member 14a closes the port 11d through movement against the force of the spring 14e. Accordingly, the volumes of the first pressure chamber 12 and the second pressure chamber 16 are decreased. Since the initial brake fluid of the wheel cylinders 51a and 52a communicating with the first pressure chamber 12, and the initial brake fluid of the wheel cylinders 53a and 54a communicating with the second pressure chamber 16, fills the wheel cylinders 51a and 52a. Therefore, hydraulic brake pressure is transmitted to the wheel cylinders 51a and 52a as soon as the first piston 11 begins movement in response to the power piston 5, and the hydraulic brake pressure is transmitted to the wheel cylinders 53a and 54a as soon as the second piston 15 begins the sliding movement in response to the sliding of the first piston 11. Thereby, the initial stroke of the brake pedal 2 is reduced and a light brake feeling is obtained.

The hydraulic pressure of the boost chamber 20a is at the predetermined boost pressure due to the position of the spool valve 28 operated by the control lever 25 in response to relative displacement of the power piston 5 to the reaction piston 22. Then, the first piston 11 is moved by the operation of the power piston 5 in response to the operation of the brake pedal 2 and the volume of the first pressure chamber 12 decreases. Furthermore, the second piston 15 slides with respect to the third piston 19, abutting the bolt 19h, in response to the movement of the first piston 11 and the volume of the second pressure chamber 16 decreases. As a result, the hydraulic brake pressure is provided to the cylinders 51a to 54a.

When the hydraulic power pressure ceases from the power source 40 and the boost pressure ceases by the stoppage of the operation of the hydraulic booster 20, the end surface of the third piston 19 contacts with the wall portion of the bore 10a and the head portion of the stop bolt 19h contacts the side surface of the circular groove 19c of the third piston 19 at the side closest to the chamber 16. Then, when the first piston 11 is moved in response to the brake pedal 2, the second piston 15 is moved. Therefore, the hydraulic pressure of the first pressure chamber 12 and the hydraulic pressure of the second pressure chamber 16 increases and the hydraulic braking system functions as an ordinary tandem master cylinder. Further, since the third pressure chamber 30 does not communicate with the first pressure chamber 12 and the second pressure chamber 16, the brake fluid of the first pressure chamber 12 and the second pressure chamber 16 is held constant.

Furthermore, for example, if leakage of the brake fluid is generated in either the wheel cylinders 51a to 54a or the hydraulic passages 71 and 72, the brake fluid of the hydraulic booster 20 is held constant. Accordingly, the boost pressure of the hydraulic booster 20 is held constant and the hydraulic brake pressure is transmitted from the first pressure chamber 12 and the second pressure chamber 16. Thereby, the predetermined braking force is ensured.

Furthermore, when the output hydraulic pressure of the hydraulic booster 20 is greater than the predetermined value, the third hydraulic passage 73 is interrupted and the third pressure chamber 30 becomes a sealed space. Therefore, when the hydraulic pressure of the first pressure chamber 12 and the second pressure chamber 16 is greater than the output hydraulic pressure of the hydraulic booster 20 by continuing to depress the brake pedal 2 after the boost operation, sudden increases in the pedal stroke are prevented.

In the above embodiment, the present invention includes a tandem master cylinder. However, the present invention can include a single master cylinder having a pressure chamber communicating with the wheel cylinders of one circuit and a dynamic hydraulic pressure generator directly communicating to its output hydraulic pressure with the wheel cylinders of the other circuit. Further, the present invention can include a tandem master cylinder having two pressure chambers communicating with the wheel cylinders of two wheels, respectively and a dynamic hydraulic pressure generator directly communicating with the wheel cylinders of two other wheels for transmitting output hydraulic pressure thereto.

Further, in the above embodiment, the relationship among $\beta_1$, $\beta_2$, $\delta_1$ and $\delta_2$ is represented as $\beta_1 > \delta_1 + \delta_2$, $\beta_2 > \delta_1$. But, it is not always necessary to provide this relationship and the present invention can include having the third piston 19 move toward the second piston 15 by the output pressure of the boost means or the dynamic hydraulic pressure generator so as to move the valve members 18a, 14a toward the closed port direction.

Further, in the above embodiment, the cut valve 60 is used as a valve means interposed in the third passage 73. But, it is possible to substitute a normally-opened differential pressure valve which interrupts the third hydraulic passage 73 when the hydraulic pressure of the pressure chamber of the master cylinder is higher than the output hydraulic pressure of the dynamic hydraulic pressure generator for the cut valve. In this case, a normally-opened electromagnetic valve can be disposed in the third hydraulic passage 73 and is controlled in response to the differential pressure between the hydraulic pressure of the pressure chamber of the master cylinder and the output hydraulic pressure of the pressure chamber of the master cylinder and the output hydraulic pressure of the dynamic hydraulic pressure generator.

Further, in the above embodiment, the present invention includes the hydraulic booster as the dynamic hydraulic pressure generator. But, it is possible to use a vacuum booster as the boost means and to use a vacuum operated actuator which is operated by a differential pressure generated in the vacuum booster to move the valve members of the master cylinder in the closed direction.

According to the present invention, since the output pressure of the boost means or the dynamic hydraulic pressure generator is applied to the power piston or the third piston, it is able to move the power piston or the third piston toward the brake pedal so as to close the normally-open valve of the master cylinder. Therefore, it is possible to reduce the initial stroke of the brake pedal without lengthening the axial length of the master cylinder and it is possible to ensure the braking force by operating as an ordinary master cylinder when the boost means or the dynamic hydraulic pressure generator is not operated.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A hydraulic braking system comprising:
   a master cylinder having a bore with an opening and a wall at opposite ends thereof, at least one piston slidably disposed in the bore and operatively connected to a brake pedal, at least one fluid chamber and at least one pressure chamber being defined in the bore by the at least one piston, said at least one piston having passage means formed therein for providing fluid communication between the fluid chamber and the pressure chamber, said at least one piston being provided with normally open valve means for closing said passage means when the at least one piston is moved in response to depression of the brake pedal;
   a power source for generating a hydraulic power pressure;
   a dynamic hydraulic braking pressure generator which receives the hydraulic power pressure supplied from the power source and transmits output pressure regulated in response to the depression of the brake pedal;
   a plurality of wheel cylinders for braking respective road wheels, divided into a first group of wheel brake cylinders connected with a first hydraulic circuit and a second group of wheel brake cylinders connected with a second hydraulic circuit;
   the pressure chamber being in fluid communication with one of said hydraulic circuits; and
   piston means slidably disposed between the piston and the closed wall and forming an operational chamber fluid-tightly separated from the pressure chamber and communicating with the dynamic hydraulic braking pressure generator so as to apply the output pressure of the dynamic hydraulic braking pressure generator therein to the wall end of the bore, and including restricting means for restricting movement of the piston means to a predetermined distance toward said at least one piston in response to the output pressure of the dynamic hydraulic braking pressure generator,
   a cut valve means interrupting the fluid communication between the dynamic hydraulic pressure generator and the operational chamber when the output hydraulic pressure of the dynamic hydraulic braking generator is larger than a predetermined value.

2. A hydraulic braking system comprising:
   a tandem master cylinder having a bore with an opening and a wall at opposite ends thereof, a first piston slidably disposed in the bore and operatively connected to a brake pedal, said first piston defining a first pressure chamber and a first fluid chamber in the bore, said first piston having first passage means formed therein for providing fluid communication between the first fluid chamber and the first pressure chamber, said first piston being provided with normally open first valve means for closing said passage means when the first piston is moved in response to depression of the brake pedal, said tandem master cylinder also including a second piston slidably positioned in the bore and defining a second fluid chamber and a second pressure chamber, said second fluid chamber being adjacent to the first pressure chamber, said second piston being operatively connected to the first piston and having second passage means formed therein for providing fluid communication between the second fluid chamber and the second pressure chamber, said second piston being provided with normally open second valve means for closing said passage means when the second piston is moved in response to depression of the brake pedal;
   a power source for generating a hydraulic power pressure;
   a dynamic hydraulic braking pressure generator which receives the hydraulic power pressure supplied from the power source and transmits output pressure regulated in response to the depression of the brake pedal;
   a plurality of wheel cylinders for braking respective road wheels; hydraulic circuit means connected to said wheel cylinders; and
   said tandem master cylinder including a third piston slidably positioned in the bore between the wall and the second piston, said third piston forming a third pressure chamber that is separated in a fluid-tight manner from the second pressure chamber and fluid communicable with the dynamic hydraulic braking pressure generator so as to apply the output pressure of the dynamic hydraulic braking pressure generator at the wall end of the bore, said first and second pressure chambers being in fluid communication with said hydraulic circuit means, said third piston being moved toward the second piston in response to the output hydraulic pressure of the dynamic hydraulic braking pressure generator so as to close the first and second normally open valves through movement of the second piston, and including restricting means for restricting movement of the third piston to a predetermined distance toward the second piston in response to the output pressure of the dynamic hydraulic braking pressure generator.

3. A hydraulic braking system as recited in claim 2, wherein the restricting means restricts the movement of the third piston to a predetermined distance which is larger than a distance for closing each normally open valve toward the second piston in response to the output pressure of the dynamic hydraulic braking pressure generator.

4. A hydraulic braking system as recited in claim 2 further comprising cut valve means for controlling fluid communication between the dynamic hydraulic braking pressure generator and the third pressure chamber.

5. A hydraulic braking system as recited in claim 4, wherein the cut valve means interrupts the fluid communication between the dynamic hydraulic pressure generator and the third pressure chamber when the output hydraulic pressure of the dynamic hydraulic braking generator is larger than a predetermined value.

6. A hydraulic braking system as recited in claim 2, wherein the dynamic hydraulic pressure generator comprises a hydraulic booster having a housing defining a boost chamber communicated with the power source through a power passage and communicated with the reservoir through a drain passage, a hydraulic pressure control valve disposed within the boost chamber and connected to the power passage and the drain passage, the hydraulic pressure control valve being arranged to control the communication of the boost chamber with the power passage and the drain passage in response to the brake pedal to control the hydraulic power pressure supplied from the power source and generate a regulated hydraulic pressure in the boost chamber, the boost chamber normally communicating with the drain passage when the brake pedal is in an initial position thereof and a power piston axially movably disposed within the housing and being applied with the regulated hydraulic pressure in the boost chamber.

7. A hydraulic braking system according to claim 2, wherein said plurality of wheel brake cylinders is divided into first and second groups of wheel brake cylinders; said hydraulic circuit means comprising first and second hydraulic circuits communicating with said first and second groups of wheel brake cylinders, respectively; said first and second pressure chambers being in fluid communication with said first and second hydraulic circuits, respectively.

* * * * *